United States Patent
Johnson et al.

(10) Patent No.: US 6,807,529 B2
(45) Date of Patent: Oct. 19, 2004

(54) SYSTEM AND METHOD FOR CONCURRENT MULTIMODAL COMMUNICATION

(75) Inventors: Greg Johnson, Downers Grove, IL (US); Senaka Balasuriya, Westmont, IL (US); James Ferrans, Wheaton, IL (US); Jerome Jahnke, Oswego, IL (US); Rainu Pierce, Barrington, IL (US); David Cuka, West Chicago, IL (US); Dilani Galagedara, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 171 days.

(21) Appl. No.: 10/085,990

(22) Filed: Feb. 27, 2002

(65) Prior Publication Data

US 2003/0167172 A1 Sep. 4, 2003

(51) Int. Cl.[7] .......................... G10L 21/00; G10L 13/08
(52) U.S. Cl. ................................. 704/270.1; 704/260
(58) Field of Search ................................ 704/270, 260, 704/270.1; 715/512, 500.1; 370/352; 709/203; 725/110; 379/67.1; 710/107

(56) References Cited

U.S. PATENT DOCUMENTS

| | | | |
|---|---|---|---|
| 5,640,590 A | * | 6/1997 | Luther ...................... 715/500.1 |
| 6,324,511 B1 | * | 11/2001 | Kiraly et al. ................ 704/260 |
| 6,570,555 B1 | * | 5/2003 | Prevost et al. ............... 345/156 |
| 2002/0128845 A1 | * | 9/2002 | Thomas et al. .......... 704/270.1 |
| 2003/0046316 A1 | * | 3/2003 | Gergic et al. ................ 707/513 |
| 2003/0126330 A1 | * | 7/2003 | Balasuriya .................. 710/107 |

* cited by examiner

Primary Examiner—Tālivaldis Ivars Šmits
Assistant Examiner—Jakieda R Jackson
(74) Attorney, Agent, or Firm—Vedder, Price, Kaufman & Kammholz, P.C.

(57) ABSTRACT

A multimodal network element facilitates concurrent multimodal communication sessions through differing user agent programs on one or more devices. For example, a user agent program communicating in a voice mode, such as a voice browser in a voice gateway that includes a speech engine and call/session termination, is synchronized with another user agent program operating in a different modality, such as a graphical browser on a mobile device. The plurality of user agent programs are operatively coupled with a content server during a session to enable concurrent multimodal interaction.

23 Claims, 8 Drawing Sheets

SYSTEM AND METHOD FOR CONCURRENT MULTIMODAL COMMUNICATION

RELATED APPLICATIONS

This application is related to co-pending application entitled "System and Method for Concurrent Multimodal Communication Session Persistence", filed on Feb. 27, 2002, having Ser. No. 10085989, owned by instant assignee and having the same inventors as the instant application; and co-pending application entitled "System and Method for Concurrent Multimodal Communication Using Concurrent Multimodal Tags," filed on Feb. 27, 2002, having Ser. No. 10084874, owned by instant assignee and having the same inventors as the instant application, both applications incorporated by reference herein.

BACKGROUND OF THE INVENTION

The invention relates generally to communication systems and methods and more particularly to multimodal communications system and methods.

An emerging area of technology involving communication devices such as handheld devices, mobile phones, laptops, PDAs, internet appliances, non-mobile devices and other suitable devices, is the application of multimodal interactions for access to information and services. Typically resident on a communication device is at least one user agent program, such as a browser, or any other suitable software that can operate as a user interface. The user agent program can respond to fetch requests (entered by a user through the user agent program or from another device or software application), receives fetched information, navigate through content servers via internal or external connections and present information to the user. The user agent program may be a graphical browser, a voice browser, or any other suitable user agent program as recognized by one of ordinary skill in the art. Such user agent programs may include, but are not limited to, J2ME application, Netscape™, Internet Explorer™, java applications, WAP browser, Instant Messaging, Multimedia Interfaces, Windows CE™ or any other suitable software implementations.

Multimodal technology allows a user to access information, such as voice, data, video, audio or other information, and services such as e-mail, weather updates, bank transactions and news or other information through one mode via the user agent programs and receive information in a different mode. More specifically, the user may submit an information fetch request in one or more modalities, such as speaking a fetch request into a microphone and the user may then receive the fetched information in the same mode (i.e., voice) or a different mode, such as through a graphical browser which presents the returned information in a viewing format on a display screen. Within the communication device, the user agent program works in a manner similar to a standard Web browser or other suitable software program resident on a device connected to a network or other terminal devices.

As such, multimodal communication systems are being proposed that may allow users to utilize one or more user input and output interfaces to facilitate communication in a plurality of modalities during a session. The user agent programs may be located on different devices. For example, a network element, such as a voice gateway may include a voice browser. A handheld device for example, may include, a graphical browser, such as a WAP browser or other suitable text based user agent program. Hence, with multimodal capabilities, a user may input in one mode and receive information back in a different mode.

Systems, have been proposed that attempt to provide user input in two different modalities, such as input of some information in a voice mode and other information through a tactile or graphical interface. One proposal suggests using a serial asynchronous approach which would require, for example, a user to input voice first and then send a short message after the voice input is completed. The user in such a system may have to manually switch modes during a same session. Hence, such a proposal may be cumbersome.

Another proposed system utilizes a single user agent program and markup language tags in existing HTML pages so that a user may, for example, use voice to navigate to a Web page instead of typing a search word and then the same HTML page can allow a user to input text information. For example, a user may speak the word "city" and type in an address to obtain visual map information from a content server. However, such proposed methodologies typically force the multimode inputs in differing modalities to be entered in the same user agent program on one device (entered through the same browser). Hence, the voice and text information are typically entered in the same HTML form and are processed through the same user agent program. This proposal, however, requires the use of a single user agent program operating on a single device.

Accordingly, for less complex devices, such as mobile devices that have limited processing capability and storage capacity, complex browsers can reduce device performance. Also, such systems cannot facilitate concurrent multimodal input of information through different user agent programs. Moreover, it may be desirable to provide concurrent multimodal input over multiple devices to allow distributed processing among differing applications or differing devices.

Another proposal suggests using a multimodal gateway and a multimodal proxy wherein the multimodal proxy fetches content and outputs the content to a user agent program (e.g. browser) in the communication device and a voice browser, for example, in a network element so the system allows both voice and text output for a device. However, such approaches do not appear to allow concurrent input of information by a user in differing modes through differing applications since the proposal appears to again be a single user agent approach requiring the fetched information of the different modes to be output to a single user agent program or browser.

Accordingly, a need exists for an improved concurrent multimodal communication apparatus and methods.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Briefly, a multimodal network element facilitates concurrent multimodal communication sessions through differing user agent programs on one or more devices. For example, a user agent program communicating in a voice mode, such as a voice browser in a voice gateway that includes a speech engine and call/session termination, is synchronized with another user agent program operating in a different modality, such as a graphical browser on a mobile device. The plurality of user agent programs are operatively coupled with a content server during a session to enable concurrent multimodal interaction.

The multimodal network element, for example, obtains modality specific instructions for a plurality of user agent programs that operate in different modalities with respect to each other, such as by obtaining differing mark up language forms that are associated with different modes, such as an HTML form associated with a text mode and a voiceXML form associated with a voice mode. The multimodal network element, during a session, synchronizes output from the plurality of user agent programs for a user based on the obtained modality specific instructions. For example, a voice browser is synchronized to output audio on one device and a graphical browser synchronized to output display on a screen on a same or different device concurrently to allow user input through one or more of the user agent programs. In a case where a user enters input information through the plurality of user agent programs that are operating in different modalities, a method and apparatus fuses, or links, the received concurrent multimodal input information input by the user and sent from the plurality of user agent programs, in response to a request for concurrent different multimodal information. As such, concurrent multimodal input is facilitated through differing user agent programs so that multiple devices or other devices can be used during a concurrent multimodal session or one device employing multiple user agent programs. Differing proxies are designated by the multimodal network element to communicate with each of the differing user agent programs that are set in the differing modalities.

Figure 1:
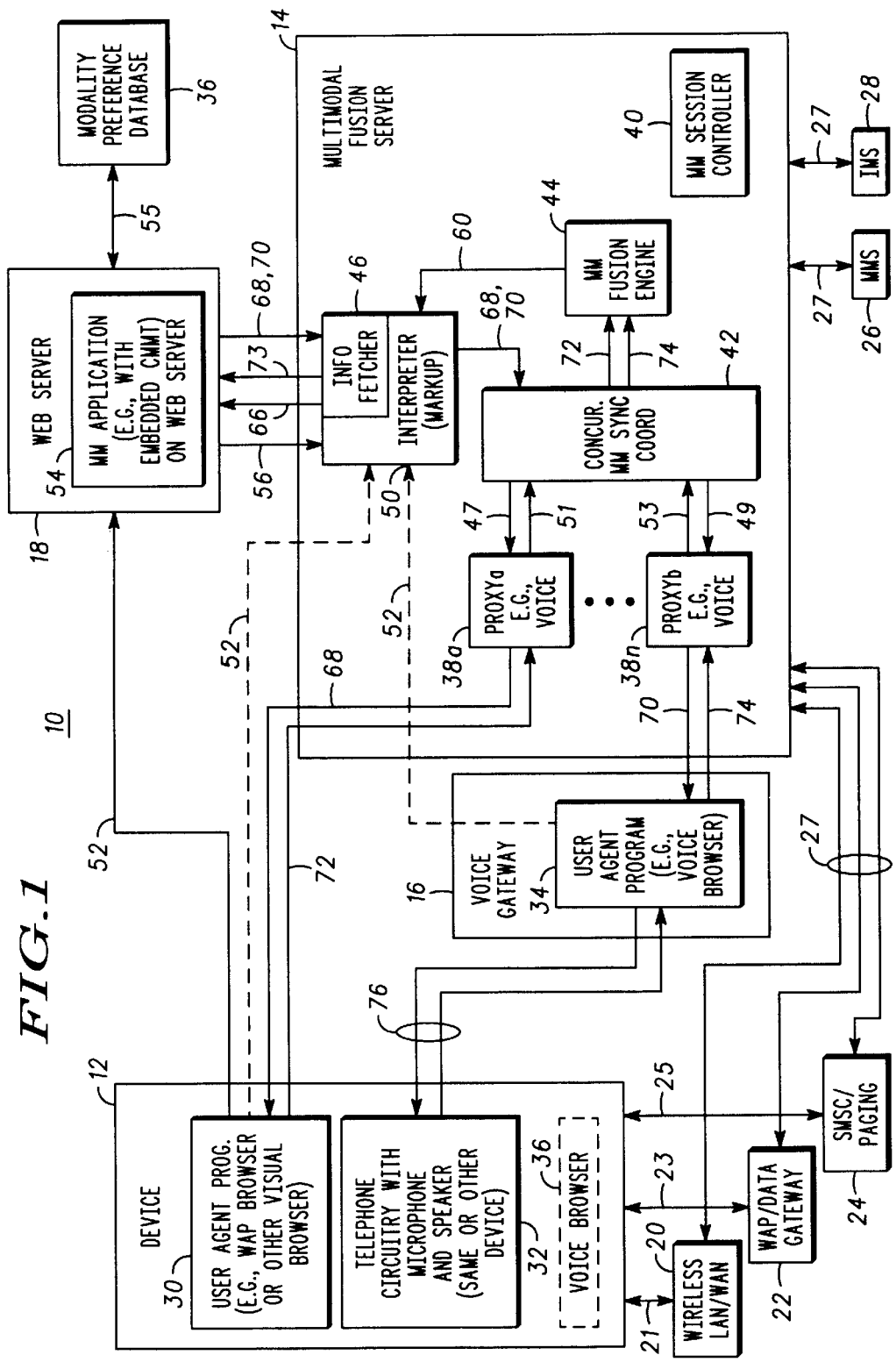
FIG. 1 is a block diagram illustrating one example of a multimodal communication system in accordance with one embodiment of the invention.

FIG. 1 illustrates one example of a multimodal communication system 10 in accordance with one embodiment of the invention. In this example, the multimodal communication system 10 includes a communication device 12, a multimodal fusion server 14, a voice gateway 16, and a content source, such as a Web server 18. The communication device 12 may be, for example, an Internet appliance, PDA, a cellular telephone, cable set top box, telematics unit, laptop computer, desktop computer, or any other mobile or non-mobile device. Depending upon the type of communication desired, the communication device 12 may also be in operative communication with a wireless local area or wide area network 20, a WAP/data gateway 22, a short messaging service center (SMSC/paging network) 24, or any other suitable network. Likewise, the multimodal fusion server 14 may be in communication with any suitable devices, network elements or networks including the internet, intranets, a multimedia server (MMS) 26, an instant messaging server (IMS) 28, or any other suitable network. Accordingly, the communication device 12 is in operative communication with appropriate networks via communication links 21, 23 and 25. Similarly, the multimodal fusion server 14 may be suitably linked to various networks via conventional communication links designated as 27. In this example, the voice gateway 16 may contain conventional voice gateway functionality including, but not limited to, a speech recognition engine, handwriting recognition engines, facial recognition engines, session control, user provisioning algorithms, and operation and maintenance controllers as desired. In this example, the communication device 12 includes a user agent program 30 such as a visual browser (e.g., graphical browser) in the form of a WAP browser, gesture recognition, tactile recognition or any other suitable browser, along with, for example, telephone circuitry which includes a microphone and speaker shown as telephone circuitry 32. Any other suitable configuration may also be used.

The voice gateway 16 includes another user agent program 34, such as a voice browser, that outputs audio information in a suitable form for output by the speaker of the telephone circuitry 32. However, it will be recognized that the speaker may be located on a different device other than the communication device 12, such as a pager or other PDA so that audio is output on one device and a visual browser via the user agent program 30 is provided on yet another device. It will also be recognized that although the user agent program 34 is present in the voice gateway 16, that the user agent program 34 may also be included in the communication device 12 (shown as voice browser 36) or in any other suitable device. To accommodate concurrent multimodal communication, as described herein, the plurality of user agent programs, namely user agent program 30 and user agent program 34, operate in different modalities with respect to each other in a given session. Accordingly, the user may predefine the mode of each of the user agent programs by signing up for the disclosed service and presetting modality preferences in a modality preference database 36 that is accessible via Web server 18 or any other server (including the MFS 14). Also, if desired, the user may select during a session, or otherwise change the modality of a given user agent program as known in the art.

The concurrent multimodal synchronization coordinator 42 may include buffer memory for temporarily storing, during a session, modality-specific instructions for one of the plurality of user agent programs to compensate for communication delays associated with modality-specific instructions for the other user agent program. Therefore, for example, if necessary, the synchronization coordinator 42 may take into account system delays or other delays to wait and output to the proxies the modality-specific instructions so that they are rendered concurrently on the differing user agent programs.

Also if desired, the user agent program 30 may provide an input interface to allow the user to mute certain multi-modes. For example, if a device or user agent program allows for multiple mode operation, a user may indicate that for a particular duration, a mode should be muted. For example, if an output mode for the user is voice but the environment that the user is in will be loud, the user may mute the output to its voice browser, for example. The multi-mode mute data that is received from the user may be stored by the multimodal fusion server 14 in, for example, the memory 602 (see FIG. 5), indicating which modalities are to be muted for a given session. The synchronization coordinator 42 may then refrain from obtaining modality-specific instructions for those modalities identified to be muted.

The information fetcher 46 obtains modality-specific instructions 69 from the multimode application 54 for the plurality of user agent programs 30 and 34. The modality-specific instructions 68, 70 are sent to the user agent programs 30 and 34. In this embodiment, the multimode application 54 includes data that identifies modality specific instructions that are associated with a different user agent program and hence a different modality as described below. The concurrent multimodal synchronization coordinator 42 is operatively coupled to the information fetcher 46 to receive the modality-specific instructions. The concurrent multimodal synchronization coordinator 42 is also operatively coupled to the plurality of proxies 38a–38n to designate those proxies necessary for a given session.

Where the differing user agent programs 30 and 34 are on differing devices, the method includes sending the request for concurrent multimodal input information 68, 70 by sending a first modality-based mark up language form to one device and sending a second modality mark up language-based form to one or more other devices to request concurrent entry of information by a user in different modalities from different devices during a same session. These markup language-based forms were obtained as the modality-specific instructions 68, 70.

The multimodal session controller 40 is used for detecting incoming sessions, answering sessions, modifying session parameters, terminating sessions and exchanging session and media information with a session control algorithm on the device. The multimodal session controller 40 may be a primary session termination point for the session if desired, or may be a secondary session termination point if, for example, the user wishes to establish a session with another gateway such as the voice gateway which in turn may establish a session with the multimodal session controller 40.

The synchronization coordinator sends output synchronization messages 47 and 49, which include the requests for concurrent multimodal input information, to the respective proxies 38a and 38n to effectively synchronize their output to the respective plurality of user agent programs. The proxies 38a and 38n send to the concurrent synchronization coordinator 42 input synchronization messages 51 and 53 that contain the received multimodal input information 72 and 74.

The concurrent multimodal synchronization coordinator 42 sends and receives synchronization message 47, 49, 51 and 53 with the proxies or with the user agent programs if the user agent programs have the capability. When the proxies 38a and 38n receive the received multimodal input information 72 and 74 from the different user agent programs, the proxies send the input synchronization messages 51 and 53 that contain the received multimodal input information 72 and 74 to the synchronization coordinator 42. The synchronization coordinator 42 forwards the received information to the multimodal fusion engine 44. Also, if the user agent program 34 sends a synchronization message to the multimodal synchronization coordinator 42, the multimodal synchronization coordinator 42 will send the synchronization message to the other user agent program 30 in the session. The concurrent multimodal synchronization coordinator 42 may also perform message transforms, synchronization message filtering to make the synchronization system more efficient. The concurrent multimodal synchronization coordinator 42 may maintain a list of current user agent programs being used in a given session to keep track of which ones need to be notified when synchronization is necessary.

The multimodal fusion server 14 includes a plurality of multimodal proxies 38a–38n, a multimodal session controller 40, a concurrent multimodal synchronization coordinator 42, a multimodal fusion engine 44, an information (e.g. modality specific instructions) fetcher 46, and a voiceXML interpreter 50. At least the multimodal session controller 40, the concurrent multimodal synchronization coordinator 42, the multimodal fusion engine 44, the information fetcher 46, and the multimodal mark up language (e.g., voiceXML) interpreter 50 may be implemented as software modules executing one or more processing devices. As such, memory containing executable instructions that when read by the one or more processing devices, cause the one or more processing devices to carry out the functions described herein with respect to each of the software modules. The multimodal fusion server 14 therefore includes the processing devices that may include, but are not limited to, digital signal processors, microcomputers, microprocessors, state machines, or any other suitable processing devices. The memory may be ROM, RAM, distributed memory, flash memory, or any other suitable memory that can store states or other data that when executed by a processing device, causes the one or more processing devices to operate as described herein. Alternatively, the functions of the software modules may be suitably implemented in hardware or any suitable combination of hardware, software and firmware as desired.

The multimodal markup language interpreter 50 may be a state machine or other suitable hardware, software, firmware or any suitable combination thereof which, inter alia, executes markup language provided by the multimodal application 54.

Figure 2:
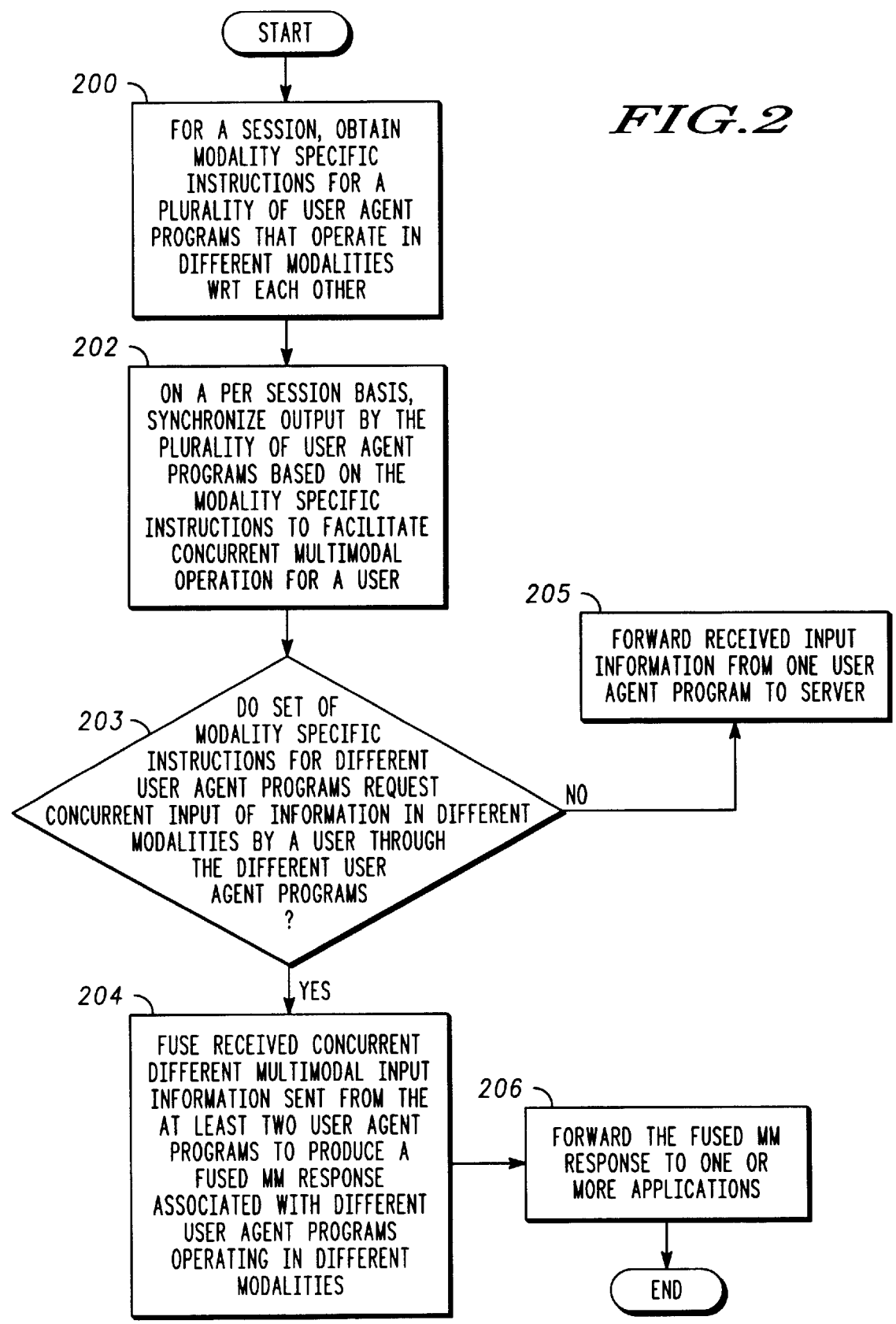
FIG. 2 is a flow chart illustrating one example of a method for multimodal communication in accordance with one embodiment of the invention.
Figure 3:
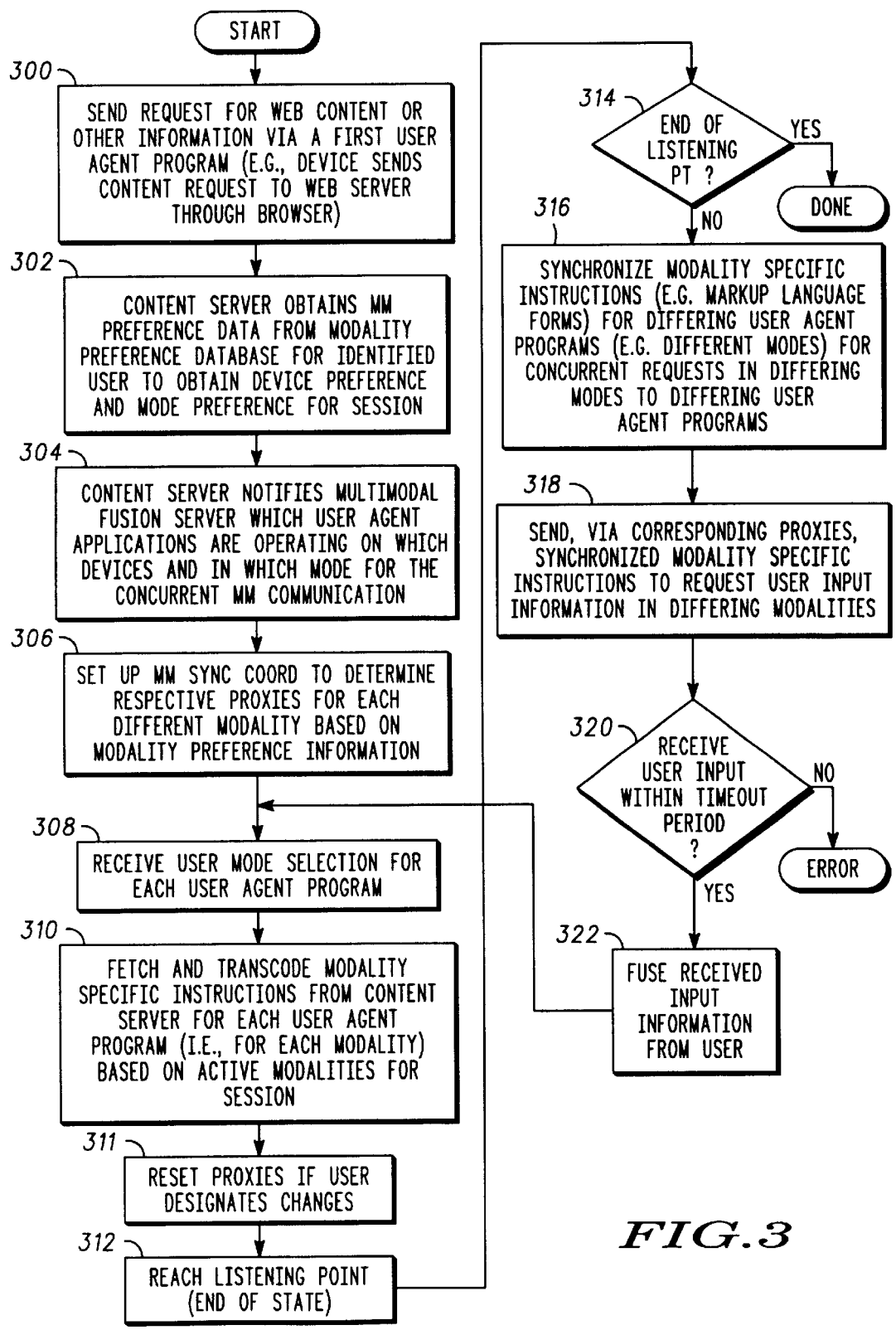
FIG. 3 is a flow chart illustrating an example of a method for multimodal communication in accordance with one embodiment of the invention.

FIG. 2 illustrates a method for multimodal communication carried out, in this example, by the multimodal fusion server 14. However, it will be recognized that any of the steps described herein may be executed in any suitable order and by any suitable device or plurality of devices. For a current multimodal session, the user agent program 30, (e.g. WAP Browser) sends a request 52 to the Web server 18 to request content from a concurrent multimodal application 54 accessible by the Web server 18. This may be done, for example, by typing in a URL or clicking on an icon or using any other conventional mechanism. Also as shown by dashed lines 52, each of the user agent programs 30 and 34 may send user modality information to the markup interpreter 50. The Web server 18 that serves as a content server obtains multimodal preferences 55 of the communication device 12 from the modality preference database 36 that was previously populated through a user subscription process to the concurrent multimodal service. The Web server 18 then informs the multimodal fusion server 14 through notification 56 which may contain the user preferences from database 36, indicating for example, which user agent programs are being used in the concurrent multimodal communication and in which modes each of the user agent programs are set. In this example, the user agent program 30 is set in a text mode and the user agent program 34 is set in a voice mode. The concurrent multimode synchronization coordinator 42 then determines, during a session, which of the plurality of multimodal proxies 38a–38n are to be used for each of the user agent programs 30 and 34. As such, the concurrent multimode synchronization coordinator 42 designates multimode proxy 38a as a text proxy to communicate with the user agent program 30 which is set in the text mode. Similarly, the concurrent multimode synchronization coordinator 42 designates proxy 38n as a multimodal proxy to communicate voice information for the user agent program 34 which is operating in a voice modality. The information fetcher, shown as a Web page fetcher 46, obtain modality specific instructions, such as markup language forms or other data, from the Web server 18 associated with the concurrent multimodal application 54.

For example, where the multimodal application 54 requests a user to enter information in both a voice mode and a text mode, the information fetcher 46 obtains the associated HTML mark up language form to output for the user agent program 30 and associated voiceXML form to output to the user agent program 34 via request 66. These modality specific instructions are then rendered (e.g. output to a screen or through a speaker) as output by the user agent programs. The concurrent multimodal synchronization coordinator 42, during a session, synchronizes the output from the plurality of user agent programs 30 and 34 based on the modality specific instructions. For example, the concurrent multimodal synchronization coordinator 42 will send the appropriate mark up language forms representing different modalities to each of the user agent programs 30 and 34 at the appropriate times so that when the voice is rendered on the communication device 12 it is rendered concurrently with text being output on a screen via the user agent program 30. For example, the multimodal application 54 may provide the user with instructions in the form of audible instructions via the user agent program 34 as to what information is expected to be input via the text Browser, while at the same time awaiting text input from the user agent program 30. For example, the multimodal application 54 may require voice output of the words "please enter your desired destination city followed by your desired departure time" while at the same time presenting a field through the user agent program 30 that is output on a display on the communication device with the field designated as "C" for the city and on the next line "D" for destination. In this example, the multimodal application is not requesting concurrent multimodal input by the user but is only requesting input through one mode, namely the text mode. The other mode is being used to provide user instructions.

Alternatively, where the multimodal application 54 requests the user to enter input information through the multiple user agent programs, the multimodal fusion engine 14 fuses the user input that is input concurrently in the different multimodal user agent programs during a session. For example, when a user utters the words "directions from here to there" while clicking on two positions on a visual map, the voice browser or user agent program 34 fills the starting location field with "here" and the destination location field with "there" as received input information 74 while the graphical browser, namely the user agent program 30, fills the starting location field with the geographical location (e.g., latitude/longitude) of the first click point on the map and the destination location field with the geographical location (e.g., latitude/longitude) of the second click point on the map. The multimodal fusion engine 44 obtains this information and fuses the input information entered by the user from the multiple user agent programs that are operating in different modalities and determines that the word "here" corresponds to the geographical location of the first click point and that the word "there" corresponds to the geographical location (e.g., latitude/longitude) of the second click point. In this way the multimodal fusion engine 44 has a complete set of information of the user's command. The multimodal fusion engine 44 may desire to send the fused information 60 back to the user agent programs 30 and 34 so that they have the complete information associated with the concurrent multimodal communication. At this point, the user agent program 30 may submit this information to the content server 18 to obtain the desired information.

As shown in block 200, for a session, the method includes obtaining modality specific instructions 68, 70, for a plurality of user agent programs that operate in different modalities with respect to one another, such as by obtaining differing types of mark up language specific to each modality for each of the plurality of user agent programs. As shown in block 202, the method includes during a session, synchronizing output, such as the user agent programs, based on the modality-specific instructions to facilitate simultaneous multimodal operation for a user. As such, the rendering of the mark up language forms is synchronized such that the output from the plurality of user agent programs is rendered concurrently in different modalities through the plurality of user agent programs. As shown in block 203, the concurrent multimodal synchronization coordinator 42 determines if the set of modality specific instructions 68, 70 for the different user agent programs 30 and 34 requests concurrent input of information in different modalities by a user through the different user agent programs. If not, as shown in block 205 the concurrent multimodal synchronization coordinator 42 forwards any received input information from only one user agent program to the destination server or Web server 18.

However, as shown in block 204, if the set of modality-specific instructions 68, 70 for the different user agent programs 30 and 34 requests user input to be entered concurrently in different modalities, the method includes fusing the received concurrent multimodal input information that the user enters that is sent back by the user agent programs 30 and 34 to produce a fused multimodal response 60 associated with different user agent programs operating in different modalities. As shown in block 206, the method includes forwarding the fused multimodal response 60 back to a currently executing application 61 in the markup language interpreter 50. The currently executing application 61 (see FIG. 5) is the markup language from the application 54 executing as part of the interpreter 50

Referring to FIGS. 1 and. 3, a more detailed operation of the multimodal communication system 10 will be described. As shown in block 300, the communication device 12 sends the request 52 for Web content or other information via the user agent program 30. As shown in block 302, the content server 18 obtains the multimodal preference data 55 from the modality preference database 36 for the identified user to obtain device preferences and mode preferences for the session. As shown in block 304, the method includes the content server notifying the multimodal fusion server 14 which user agent applications are operating on which devices and in which mode for the given concurrent different multimodal communication session.

As previously noted and shown in block 306, the concurrent multimodal synchronization coordinator 42 is set up to determine the respective proxies for each different modality based on the modality preference information 55 from the modality preference database 36. As shown in block 308, the method includes, if desired, receiving user mode designations for each user agent program via the multimodal session controller 40. For example, a user may change a desired mode and make it different from the preset modality preferences 55 stored in the modality preference database 36. This may be done through conventional session messaging. If the user has changed the desired mode for a particular user agent program, such as if a user agent program that is desired is on a different device, different modality-specific instructions may be required, such as a different mark up language form. If the user modality designation is changed, the information fetcher 46 fetches and request the appropriate modality-specific instructions based on the selected modality for a user agent application.

As shown in block 310, the information fetcher 46 then fetches the modality specific instructions from the content server 18 shown as fetch request 66, for each user agent program and hence for each modality. Hence, the multimodal fusion server 14 via the information fetcher 46 obtains mark up language representing different modalities so that each user agent program 30 and 34 can output information in different modalities based on the mark up language. However, it will be recognized that the multimodal fusion server 14 may also obtain any suitable modality-specific instructions and not just mark up language based information.

Figure 5:
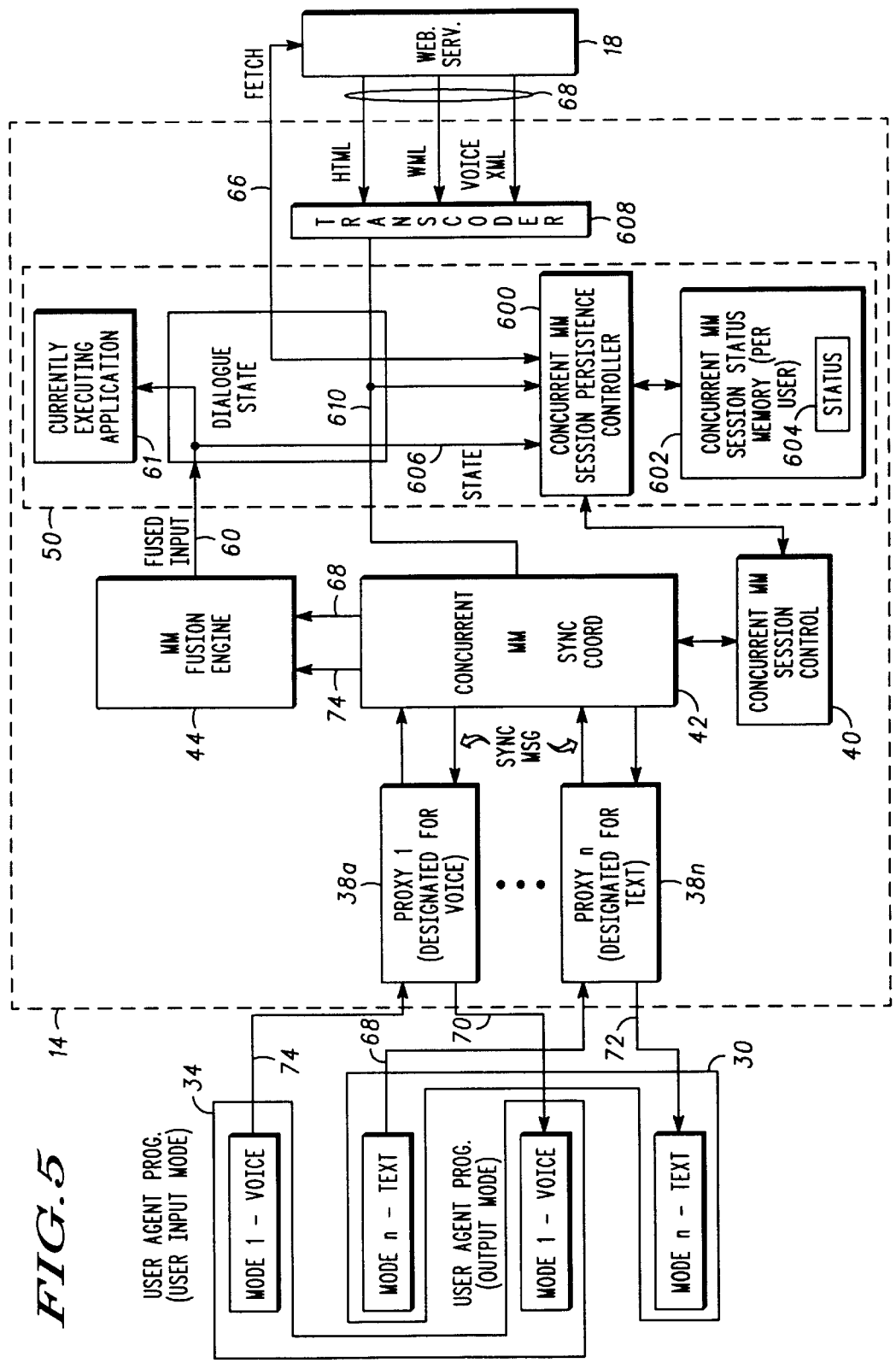
FIG. 5 is a block diagram illustrating one example of a multimodal network element in accordance with embodiment of the invention.

When the modality-specific instructions are fetched from the content server 18 for each user agent program and no CMMT is associated with the modality specific instruction 68, 70, the received modality specific instructions 69 may be sent to the transcoder 608 (see FIG. 5). The transcoder 608 transcodes received modality specific instructions into a base markup language form as understood by the interpreter 50 and creates a base markup language form with data identifying modality specific instructions for a different modality 610. Hence, the transcoder transcodes modality specific instructions to include data identifying modality specific instructions for another user agent program operating in a different modality. For example, if interpreter 50 uses a base markup language such as voiceXML and if one set of the modality specific instructions from the application 54 are in voiceXML and the other is in HTML, the transcoder 606 embeds a CMMT in the voiceXML form identifying a URL from where the HTML form can be obtained, or the actual HTML form itself. In addition, if none of the modality specific instructions are in the base mark up language, a set of the modality specific instructions are translated into the base mark up language and thereafter the other set of modality specific instructions are referenced by the CMMT.

Alternatively, the multimodal application 54 may provide the necessary CMMT information to facilitate synchronization of output by the plurality of user agent programs during a concurrent multimodal session. One example of modality specific instructions for each user agent program is shown below as a markup language form. The markup language form is provided by the multimodal application 54 and is used by the multimodal fusion server 14 to provide a concurrent multimodal communication session. The multimodal voiceXML interpreter 50 assumes the multimodal application 54 uses voiceXML as the base language. To facilitate synchronization of output by the plurality of user agent programs for the user, the multimodal application 54 may be written to include, or index, concurrent multimodal tags (CMMT) such as an extension in a voiceXML form or an index to a HTML form. The CMMT identifies a modality and points to or contains the information such as the actual HTML form to be output by one of the user agent programs in the identified modality. The CMMT also serves as multimodal synchronization data in that its presence indicates the need to synchronize different modality specific instructions with different user agent programs.

For example, if voiceXML is the base language of the multimodal application 54, the CMMT may indicate a text mode. In this example, the CMMT may contain a URL that contains the text in HTML to be output by the user agent program or may contain HTML as part of the CMMT. The CMMT may have properties of an attribute extension of a markup language. The multimodal voiceXML interpreter 50 fetches the modality specific instructions using the information fetcher 46 and analyzes (in this example, executes) the fetched modality specific instructions from the multimodal application to detect the CMMT. Once detected, the multimodal voiceXML interpreter 50 interprets the CMMT and obtains if necessary any other modality specific instructions, such as HTML for the text mode.

For example, the CMMT may indicate where to get text info for the graphical browser. Below is a table showing an example of modality specific instructions for a concurrent multimodal itinerary application in the form of a voiceXML form for a concurrent multimodal application that requires a voice browser to output voice asking "where from" and "where to" while a graphical browser displays "from city" and "to city." Received concurrent multimodal information entered by a user through the different browsers is expected by fields designated "from city" and "to city."

TABLE 1

```
<vxml version="2.0">
    <form>
        <block>
            <cmmt mode="html"        indicates the non-voice
             src="./itinerary.html"/>  mode is html (text) and
                                      that the source info is
                                      located at url
                                      itinerary.html
        </block>
        <field name="from_city"> expected - text
                                piece of info, trying to collect
                                through graphical browser
            <grammar src="./city.xml"/> for voice need
                                to list possible responses
                                for speech recog engine
            Where from? is the prompt that is spoken by voice browser
        </field>
        <field name="to_city"> text expecting
            <grammar src="./city.xml"/>
            Where to? Voice spoken by voice browser
        </field>
    </form>
</vxml>
```

Hence, the markup language form above is written in a base markup language representing modality specific instructions for at least one the user agent programs, and CMMT is an extension designating modality specific instructions for another user agent program operating in a different modality.

As shown in block 311 if the user changed preferences, the method includes resetting the proxies to be consistent with the change. As shown in block 312, the multimodal fusion server 14 determines if a listen point has been reached. If so, it enters the next state as shown in block 314. If so, the process is complete. If not, the method includes synchronizing the modality-specific instructions for the differing user agent programs. The multimodal voiceXML interpreter 50 outputs, in this example, HTML for user agent program 30 and voiceXML for user agent 34 to the concurrent multimodal synchronization coordinator 42 for synchronized output by the plurality of user agent programs.

This may be done for example based on the occurrence of listening points as noted above. This is shown in block 316.

As shown in block 318, the method includes sending, such as by the concurrent multimodal synchronization coordinator 42, to the corresponding proxies 38a and 38n, the synchronized modality-specific instructions 68 and 70 to request user input information by the user in differing modalities during the same session. The synchronized requests 68 and 70 are sent to each of the user agent programs 30 and 34. For example, the requests for concurrent different modality input information corresponding to the multiple input modalities associated with the differing user agent programs are shown as synchronized requests that contain the modality specific instructions 68 and 70. These may be synchronized mark up language forms, for example.

Once the user agent programs 30 and 34 render the modality-specific instructions concurrently, the method includes determining whether or not user input was received within a time out period as shown in block 320 or if another event occurred. For example, the multimodal fusion engine 44 may wait a period of time to determine whether the multimodal input information entered by a user was suitably received from the plurality of user agent programs for fusion. This waiting period may be a different period of time depending upon a modality setting of each user agent program. For example, if a user is expected to enter both voice and text information concurrently but the multimodal fusion engine does not receive the information for fusing within a period of time, it will assume that an error has occurred. Moreover, the multimodal fusion engine 44 may allow more time to elapse for voice information to be returned than for text information, since voice information may take longer to get processed via the voice gateway 16.

In this example, a user is requested to input text via the user agent program 30 and to speak in the microphone to provide voice information to the user agent program 34 concurrently. Received concurrent multimodal input information 72 and 74 as received from the user agent programs 30 and 34 are passed to respective proxies via suitable communication links. It will be noted that the communications designated as 76 between the user agent program 34 and the microphone and speaker of the device 12 are communicated in PCM format or any other suitable format and in this example are not in a modality-specific instruction format that may be output by the user agent programs.

If the user inputs information concurrently through a text browser and the voice browser so that the multimodal fusion engine 44 receives the concurrent multimodal input information sent from the plurality of user agent programs, the multimodal fusion engine 44 fuses the received input information 72 and 74 from the user as shown in block 322.

Figure 4:
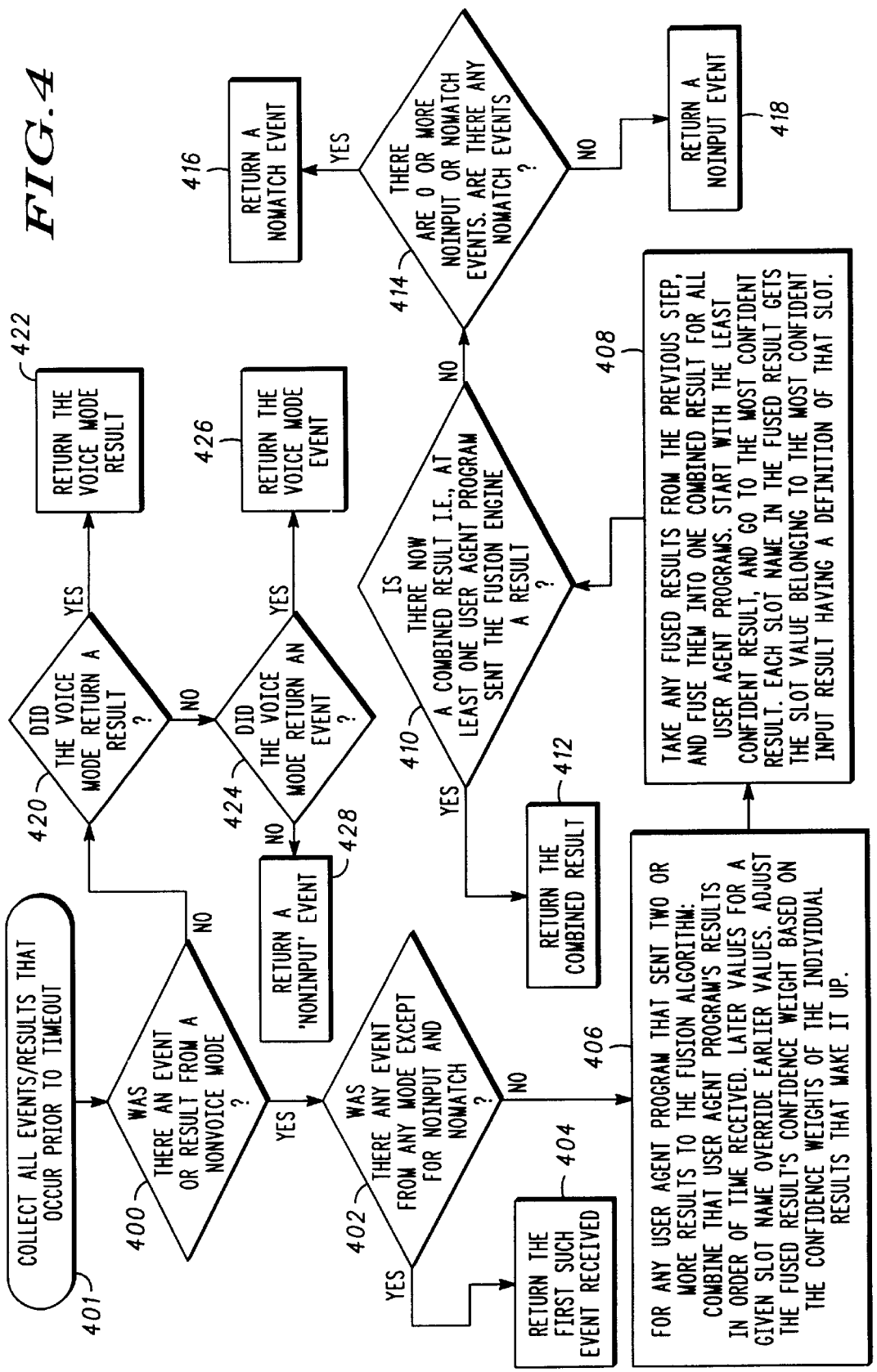
FIG. 4 is a flow chart illustrating one example of a method for fusing received concurrent multimodal input information in accordance with one embodiment of the invention.

FIG. 4 illustrates one example of the operation of the multimodal fusion engine 44. For purposes of illustration, for an event, "no input" means nothing was input by the user through this mode. A "no match" indicates that something was input, but it was not an expected value. A result is a set of slot (or field) name and corresponding value pairs from a successful input by a user. For example, a successful input may be "City=Chicago" and "State=Illinois" and "Street"= "first street" and a confidence weighing factor from, for example, 0% to 100%. As noted previously, whether the multimodal fusion engine 44 fuses information can depend based on the amount of time between receipt or expected receipt of slot names (e.g., variable) and value pairs or based on receipt of other events. The method assumes that confidence levels are assigned to received information. For example, the synchronization coordinator and that weights confidences based on modality and time of arrival of information. For example, typed in data is assumed to be more accurate than spoken data as in the case where the same slot data can be input through different modes during the same session (e.g., speak the street name and type it in). The synchronization coordinator combines received multimodal input information sent from one of the plurality of user agent programs sent in response to the request for concurrent different multimodal information based on a time received and based on confidence values of individual results received.

As shown in block 400, the method includes determining if there was an event or a result from a non-voice mode. If so, as shown in block 402, the method includes determining whether there was any event from any mode except for a "no input" and "no match" event. If yes, the method includes returning the first such event received to the interpreter 50, as shown in block 404. However, if there was not an event from a user agent program except for the "no input" and "no match", the process includes, as shown in block 406, for any mode that sent two or more results for the multimodal fusion engine, the method includes combining that mode's results in order of time received. This may be useful where a user re-enters input for a same slot. Later values for a given slot name will override earlier values. The multimodal fusion engine adjusts the results confidence weight of the mode based on the confidence weights of the individual results that make it up. For each modality the final result is one answer for each slot name. The method includes, as shown in block 408, taking any results from block 406 and combining them into one combined result for all modes. The method includes starting with the least confident result and progressing to the most confident result. Each slot name in the fused result receives the slot value belonging to the most confident input result having a definition of that slot.

As shown in block 410, the method includes determining if there is now a combined result. In other words, did a user agent program send a result for the multimodal fusion engine 44. If so, the method includes, as shown in block 412, returning the combined results to the content server 18. If not, as shown in block 414, it means that there are zero or more "no input" or "no match" events. The method includes determining if there are any "no match" events. If so, the method includes returning the no match event as shown in block 416. However, if there are no "no match" events, the method includes returning the "no input" event to the interpreter 50, as shown in block 418.

Returning to block 400, if there was not an event or result from a non-voice mode, the method includes determining if the voice mode returned a result, namely if the user agent program 34 generated the received information 74. This is shown in block 420. If so, as shown in block 422, the method includes returning the voice response the received input information to the multimodal application 54. However, if the voice browser (e.g., user agent program) did not output information, the method includes determining if the voice mode returned an event, as shown in block 424. If yes, that event is then reported 73 to the multimodal application 54 as shown in block 426. If no voice mode event has been produced, the method includes returning a "no input" event, as shown in block 428.

The below Table 2 illustrates an example of the method of FIG. 4 applied to hypothetical data.

TABLE 2

VoiceModeCollectedData
STREETNAME=Michigan
    TIMESTAMP=0
    CONFIDENCELEVEL=.85
NUMBER=112
    TIMESTAMP=0
    CONFIDENCELEVEL=.99
TextModeCollectedData
STREETNAME=Michigan
    TIMESTAMP=0
    CONFIDENCELEVEL=1.0
STREETNAME=LaSalle
    TIMESTAMP=1
    CONFIDENCELEVEL=1.0
For example, in block 400 if no results from a non voice mode were received, the method proceed to block402. In block 402 no events at all were received the method proceeds to block 406. In block 406 the fusion engine collapses TextModeCollectedData into one response per slot. Voice Mode Collected Data remains untouched.
VoiceModeCollectedData
STREETNAME=Michigan
    TIMESTAMP=0
    CONFIDENCELEVEL=.85
NUMBER=112
    TIMESTAMP=0
    CONFIDENCELEVEL=.99
OVERALLCONFIDENCE=.85
Voice Mode remained untouched. But an overall confidence value of .85 is assigned as .85 is the lowest confidence in result set.
TextModeCollectedData
STREETNAME=Michigan
    TIMESTAMP=0
    CONFIDENCELEVEL=1.0
STREETNAME=LaSalle
    TIMESTAMP=1
    CONFIDENCELEVEL=1.0
Textmode Removes Michigan from the collected data because that slot was filled at a later timestamp with LaSalle. The final result looks like this. And an overall confidence level of 1.0 is assigned as 1.0 is the lowest confidence level in the result set.
TextModeCollectedData
STREETNAME=LaSalle
    TIMESTAMP=1
    CONFIDENCELEVEL=1.0
OVERALLCONFIDENCE=1.0
What follows is the data sent to block 408.
VoiceModeCollectedData
STREETNAME=Michigan
    TIMESTAMP= 0
    CONFIDENCELEVEL=.85
NUMBER=112
    TTMESTAMP=0
    CONFIDENCELEVEL=.99
OVERALLCONFIDENCE=.85
TextModeCollectedData
STREETNAME=LaSalle
    TIMESTAMP=1
    CONFIDENCELEVEL=1.0
OVERALLCONFIDENCE=1.0
In block 408 the two modes are effectively fused into a single return result.
First the entire result of the lowest confidence level is taken and placed into the Final Result Structure.
FinalResult
STREETNAME=Michigan
    CONFIDENCELEVEL=.85
NUMBER=112
    CONFIDENCELEVEL=.99
Then any elements of the next lowest result are replaced in the final result.
FinalResult
STREETNAME=LaSalle
    CONFIDENCELEVEL=1.0
NUMBER=112
    CONFIDENCELEVEL=.99
This final result is the from the fusion of the two modalities, which is sent to the interpreter which will decide what to do next (either fetch TABLE 2-continued more information from the web or decide more information is needed from the user and re-prompt them based on the current state.)
0

FIG. 5 illustrates another embodiment of the multimodal fusion server 14 which includes a concurrent multimodal session persistence controller 600 and concurrent multimodal session status memory 602 coupled to the concurrent multimodal session persistence controller 600. The concurrent multimodal modal session persistence controller 600 may be a software module running on a suitable processing device, or may be any suitable hardware, software, firmware or any suitable combination thereof. The concurrent multimodal session persistence controller 600 maintains, during non-session conditions, and on a per-user basis, concurrent multimodal session status information 604 in the form of a database or other suitable data structure. The concurrent multimodal session status information 604 is status information of the plurality of user agent programs that are configured for different concurrent modality communication during a session. The concurrent multimodal session persistence controller 600 re-establishes a concurrent multimodal session that has previously ended in response to accessing the concurrent multimodal session status information 604. The multimodal session controller 40 notifies the concurrent multimodal session persistence controller 600 when a user has joined a session. The multimodal session controller 40 also communicates with the concurrent multimodal synchronization coordinator to provide synchronization with any off line devices or to synchronize with any user agent programs necessary to re-establish a concurrent multimodal session.

The concurrent multimodal session persistence controller 600 stores, for example, proxy ID data 906 such as URLs indicating the proxy used for the given mode during a previous concurrent multimodal communication session. If desired, the concurrent multimodal session state memory 602 may also includes information indicating which field or slot has been filled by user input during a previous concurrent multimodal communication session along with the content of any such fields or slots. In addition, the concurrent multimodal session state memory 602 may include current dialogue states 606 for the concurrent multimodal communication session. Some states include where the interpreter 50 is in its execution of the executing application. The information on which field has been filled by the user may be in the form of the fused input information 60.

As shown, the Web server 18 may provide modality-specific instructions for each modality type. In this example, text is provided in the form of HTML forms, voice is provided in the form of voiceXML forms, and voice is also provided in WML forms. The concurrent multimodal synchronization coordinator 42 outputs the appropriate forms to the appropriate proxy. As shown, voiceXML forms are output through proxy 38a which has been designated for the voice browser whereas HTML forms are output to the proxy 38n for the graphical browser.

Session persistence maintenance is useful if a session gets terminated abnormally and the user would like to come back to the same dialogue state later on. It may also be useful of the modalities use transport mechanisms that have different delay characteristics causing a lag time between input and output in the different modalities and creating a need to store information temporarily to compensate for the time delay.

Figure 6:
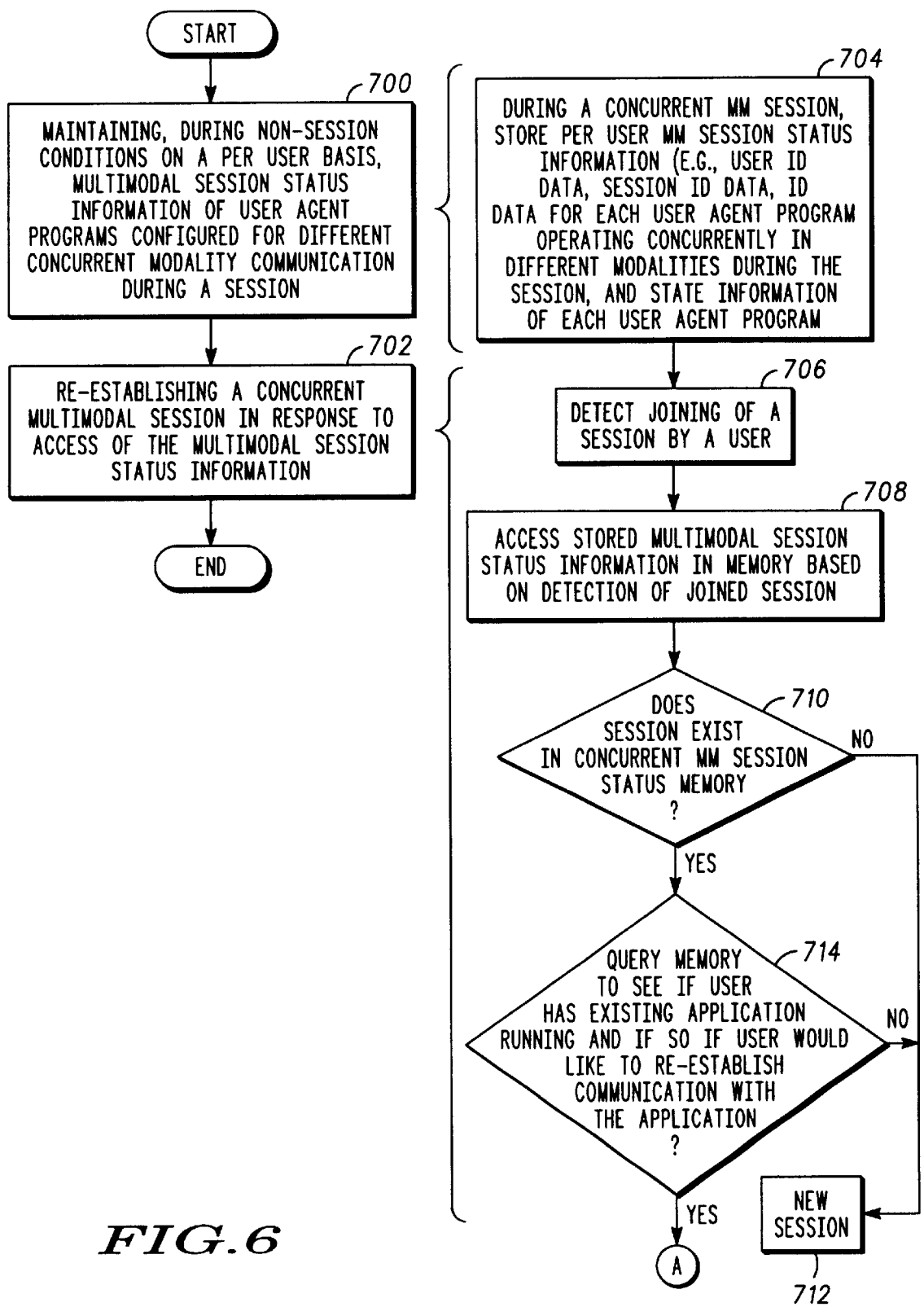
FIG. 6 is a flow chart illustrating one example of a method for maintaining multimodal session persistence in accordance with one embodiment of the invention.
Figure 7:
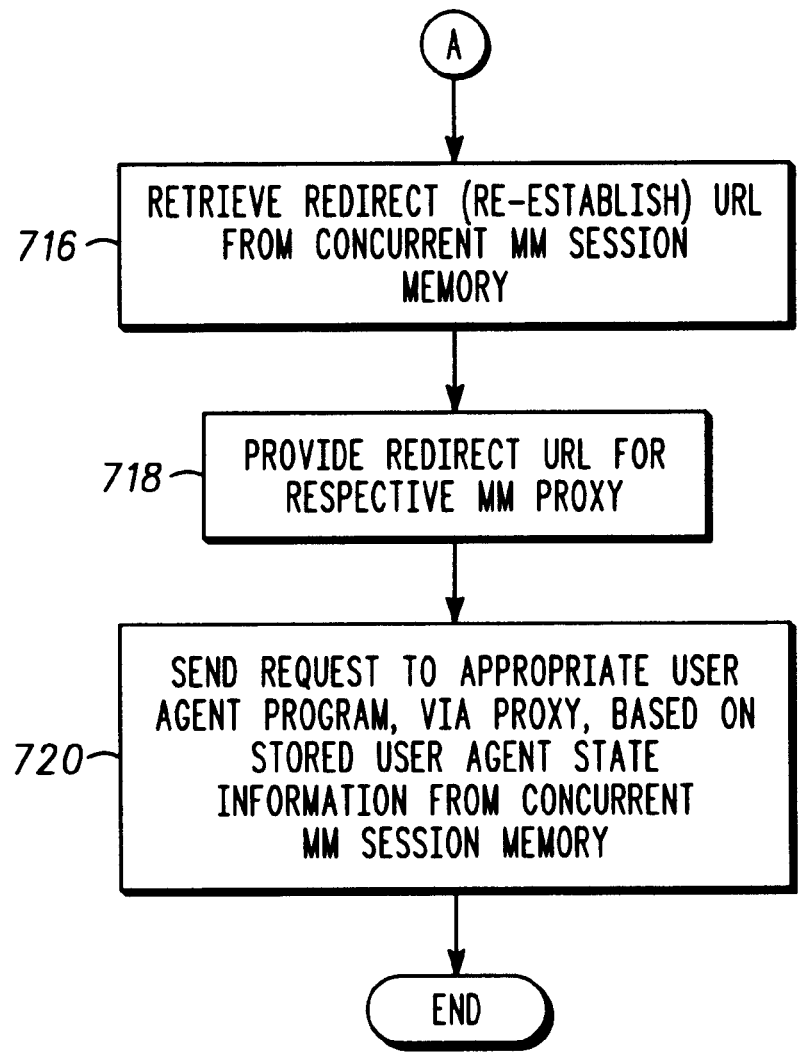
FIG. 7 is a flow chart illustrating a portion of the flow chart shown in FIG. 6.

As shown in FIGS. 6–7, the concurrent multimodal session persistence controller 600 maintains the multimodal session status information for a plurality of user agent programs for a given user for a given session wherein the user agent programs have been configured for different concurrent modality communication during a session. This is shown in block 700. As shown in block 702, the method includes re-establishing a previous concurrent multimodal session in response to accessing the multimodal session status information 604. As shown in block 704, in more detail, during a concurrent multimodal session, the concurrent multimodal session persistence controller 600 stores in memory 602 the per user multimodal session status information 604. As shown in block 706, the concurrent multimodal session persistence controller 600 detect the joining of a session by a user from the session controller and searches the memory for the user ID to determine if the user was involved in the previous concurrent multimodal session. Accordingly, as shown in block 708, the method includes accessing the stored multimodal session status information 604 in the memory 602 based on the detection of the user joining the session.

As shown in block 710, the method includes determining if the session exists in the memory 604. If not, the session is designated as a new session and a new entry is created to populate the requisite data for recording the new session in memory 602. This is shown in block 712. As shown in block 714, if the session does exist, such as the session ID is present in the memory 602, the method may include querying memory 602 if the user has an existing application running and if so, if the user would like to re-establish communication with the application. If the user so desires, the method includes retrieving the URL of the last fetched information from the memory 602. This is shown in block 716 (FIG. 7). As shown in block 718, the appropriate proxy 38a–38n will be given the appropriate URL as retrieved in block 716. As shown in block 720, the method includes sending a request to the appropriate user agent program via the proxy based on the stored user agent state information 606 stored in the memory 602.

Figure 8:
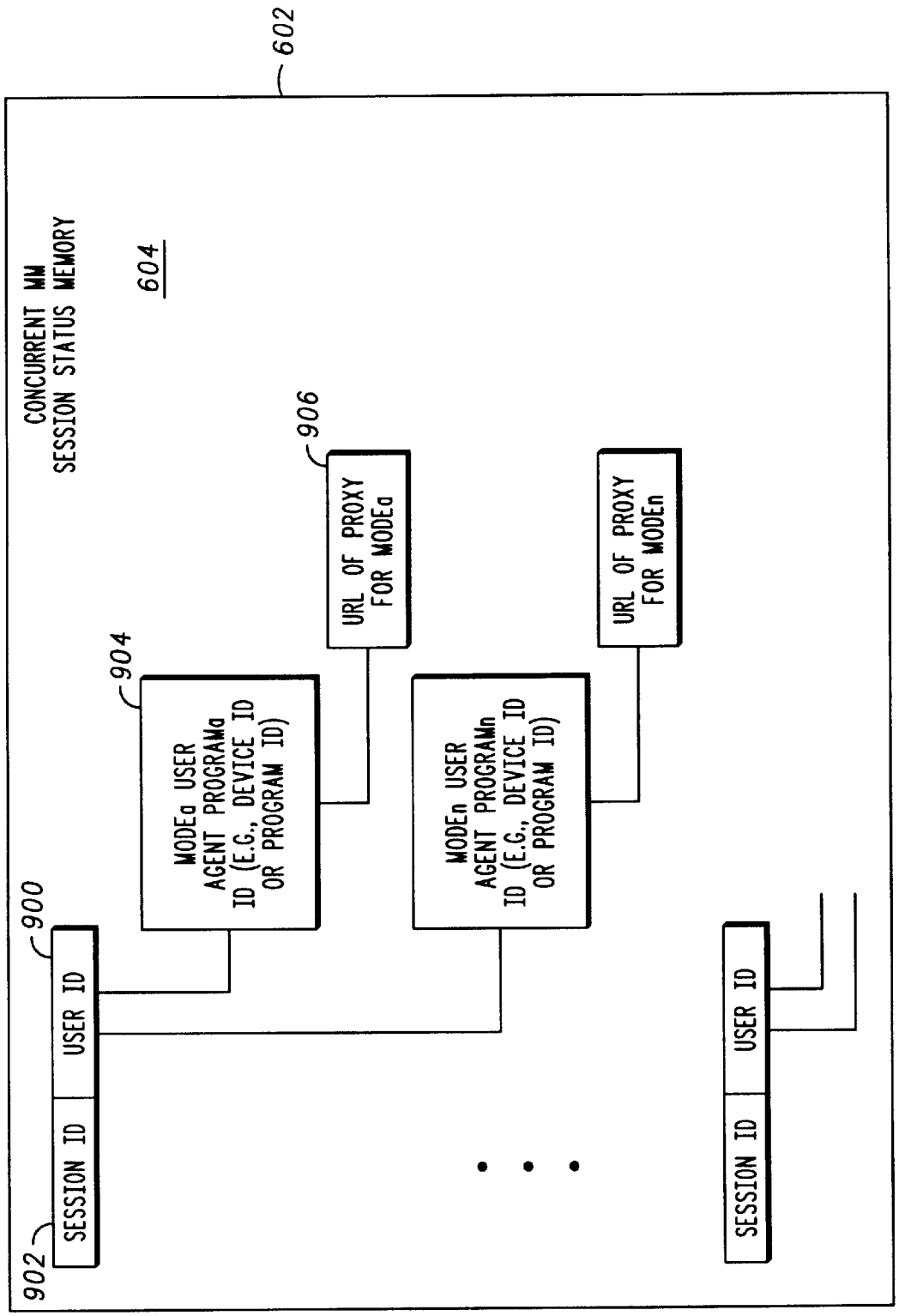
FIG. 8 is a block diagram representing one example of concurrent multimodal session status memory contents in accordance with one embodiment of the invention.

FIG. 8 is a diagram illustrating one example of the content of the concurrent multimodal session status memory 602. As shown, a user ID 900 may designate a particular user and a session ID 902 may be associated with the user ID in the event the user has multiple sessions stored in the memory 602. In addition, a user agent program ID 904 indicates, for example, a device ID as to which device is running the particular user agent program. The program ID may also be a user program identifier, URL or other address. The proxy ID data 906 indicating the multimodal proxy used during a previous concurrent multimodal communication. As such, a user may end a session and later continue where the user left off.

Maintaining the device ID 904 allows, inter alia, the system to maintain identification of which devices are employed during a concurrent multimodal session to facilitate switching of devices by a user during a concurrent multimodal communication.

Accordingly, multiple inputs entered through different modalities through separate user agent programs distributed over one or more devices, (or if they are contained the same device), are fused in a unified and cohesive manner. Also, a mechanism to synchronize both the rendering of the user agent programs and the information input by the user through these user agent programs is provided. In addition, the disclosed multimodal fusion server can be coupled to existing devices and gateways to provide concurrent multimodal communication sessions.

It should be understood that the implementation of other variations and modifications of the invention in its various aspects will be apparent to those of ordinary skill in the art, and that the invention is not limited by the specific embodiments described. For example, it will be recognized that although the methods are described with certain steps, the steps may be carried out in any suitable order as desired. It is therefore contemplated to cover by the present invention, any and all modifications, variations, or equivalents that fall within the spirit and scope of the basic underlying principles disclosed and claimed herein.

What is claimed is:

1. A method for multimodal communication comprising:
   obtaining modality specific instructions for a plurality of user agent programs that operate in different input modalities with respect to each other; and
   during a session, synchronizing output from the plurality of user agent programs based on the modality specific instructions.

2. The method of claim 1 wherein the step of synchronizing output by the plurality of user agent programs includes sending, for use by the plurality of user agent programs, at least portions of markup language representing different modalities such that each user agent program outputs information in different modalities based on the at least portions of markup language.

3. The method of claim 2 wherein one of the plurality of user agent programs includes a graphical browser and wherein another of the plurality of user agent programs includes a voice browser and wherein the output from the plurality of user agent programs includes user input entered concurrently in different modalities through the plurality of user agent programs.

4. The method of claim 2 wherein the step of sending, for use by the plurality of user agent programs, at least portions of markup language representing different modalities includes sending markup language forms associated with different modalities to different devices wherein each of the devices operates one of the plurality of user agent programs.

5. The method of claim 2 wherein the step of sending, for use by the plurality of user agent programs, at least portions of markup language representing different modalities includes sending markup language forms associated with different modalities to a same device wherein the device operates the plurality of user agent programs in different modalities.

6. The method of claim 1 including the step of determining, during a session, a proxy for communication with each of the plurality of user agent programs.

7. The method of claim 2 wherein the step of obtaining modality specific instructions for the plurality of user agent programs includes communicating with an application that provides differing markup language formats for each of the plurality of user agent programs wherein the differing markup language formats represent different modalities.

8. The method of claim 1 wherein obtaining modality specific instructions for the plurality of user agent programs that operate in different modalities includes fetching a markup language form written in a base markup language representing modality specific instructions for at least one of the user agent programs, and wherein the markup language form contains data identifying modality specific instructions for another user agent program operating in a different modality.

9. The method of claim 1 wherein synchronizing output from the plurality of user agent programs based on the modality specific instructions includes analyzing fetched modality specific instructions from a multimodal application to detect a concurrent multimodal tag (CMMT) and if detected, obtaining modality specific instructions for at least one user agent program based on the CMMT.

10. A multimodal network element comprising:
an information fetcher operative to obtain modality specific instructions for a plurality of user agent programs that operate in different input modalities with respect to each other during a same session; and
a concurrent multimodal synchronization coordinator, operatively coupled to the information fetcher and operative to, during the session, synchronize output from the plurality of user agent programs based on the modality specific instructions.

11. The multimodal network element of claim 10 wherein the concurrent multimodal synchronization coordinator determines, during a session, a proxy for communication with each of the plurality of user agent programs.

12. A method for multimodal communication comprising:
sending a request for concurrent multimodal input information corresponding to multiple input modalities associated with a plurality of user agent programs operating during a same session; and
fusing received concurrent multimodal input information sent from the plurality of user agent programs sent in response to the request for concurrent different multimodal information.

13. The method of claim 12 including the step of:
prior to sending the request for concurrent multimodal input information, determining a proxy for each different modality associated with each application associated with a different modality for a given session; and
synchronizing the request for concurrent different multimodal input information to the plurality of user agent programs using the proxies determined for each different modality.

14. The method of claim 12 including waiting a period of time to determine whether the concurrent multimodal input information was suitably received for fusion.

15. The method of claim 14 including waiting a different period of time depending on a modality of each user agent program.

16. The method of claim 12 wherein sending the request for concurrent multimodal input information corresponding to multiple input modalities includes sending modality specific instructions for a plurality of user agent programs that operate in different modalities with respect to each other to request concurrent entry of information in different modalities.

17. The method of claim 12 wherein the step of sending the request for concurrent multimodal input information corresponding to multiple input modalities includes sending a first modality based markup language form to a device and sending a second modality markup language based form to one or more devices to request concurrent entry of information in different modalities.

18. The method of claim 12 including the step of combining received multimodal input information sent from one of the plurality of user agent programs sent in response to the request for concurrent different multimodal information based on a time received and based on confidence values of individual results received.

19. The method of claim 12 including transcoding modality specific instructions to include data identifying modality specific instructions for another user agent program operating in a different modality.

20. A multimodal network element comprising:
a plurality of proxies that each send a request for concurrent multimodal input information corresponding to multiple input modalities associated with a plurality user agent programs operating during a same session; and
a multimodal fusion engine, operatively responsive to received concurrent multimodal input information sent from the plurality of user agent programs sent in response to the request for concurrent different multimodal information and operative to fuse the different multimodal input information sent from the plurality of user agent programs to provide concurrent multimodal communication from differing user agent programs during a same session.

21. The multimodal network element of claim 20 wherein the request for concurrent different multimodal information includes modality specific instructions for the plurality of user agent programs that operate in different modalities with respect to each other to request concurrent entry of information in different modalities, and wherein the multimodal network element includes:
an information fetcher operative to obtain modality specific instructions for the plurality user agent programs that operate in different modalities with respect to each other during a same session; and
a concurrent multimodal synchronization coordinator, operatively coupled to the information fetcher and the plurality of proxies, operative to synchronize the received concurrent multimodal input information output from the plurality of user agent programs, during a session.

22. The multimodal network element of claim 21 including:
a concurrent multimodal session persistence controller operatively coupled to the plurality user agent programs, to maintain, during non-session conditions and on a per user basis, concurrent multimodal session status information of the plurality user agent programs configured for different concurrent modality communication during a session and to re-establish a concurrent multimodal session in response to accessing the concurrent multimodal session status information; and
memory, operatively coupled to the concurrent multimodal session persistence controller, containing the concurrent multimodal session status information.

23. The multimodal network element of claim 20 including a markup language interpreter and a transcoder, operatively coupled to the markup language interpreter, wherein the transcoder transcodes modality specific instructions to include data identifying modality specific instructions for another user agent program operating in a different modality.

* * * * *